(12) United States Patent
Namiki et al.

(10) Patent No.: US 10,134,504 B2
(45) Date of Patent: Nov. 20, 2018

(54) FLAT CABLE

(71) Applicant: SUMITOMO ELECTRIC INDUSTRIES, LTD., Osaka-shi, Osaka (JP)

(72) Inventors: Yuya Namiki, Kanuma (JP); Yoshimasa Watanabe, Kanuma (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/057,217

(22) Filed: Mar. 1, 2016

(65) Prior Publication Data

US 2016/0260521 A1 Sep. 8, 2016

(30) Foreign Application Priority Data

Mar. 4, 2015 (JP) ................. 2015-042510

(51) Int. Cl.
*H01B 7/08* (2006.01)
*G01K 7/02* (2006.01)

(52) U.S. Cl.
CPC ............. *H01B 7/0823* (2013.01); *G01K 7/02* (2013.01)

(58) Field of Classification Search
CPC .................................................... H01B 7/08
USPC ........................................ 174/117 F, 117 FF
See application file for complete search history.

(56) References Cited

U.S. PATENT DOCUMENTS

| 5,106,701 A * | 4/1992 | Kurosaka ................. C22F 1/08 148/432 |
| 5,347,090 A * | 9/1994 | Cerda ...................... H01R 4/04 156/296 |
| 6,372,996 B2 * | 4/2002 | Lin ........................ H05K 1/0224 174/117 FF |
| 6,633,002 B2 * | 10/2003 | Atou ...................... H05K 1/028 174/117 F |

FOREIGN PATENT DOCUMENTS

| JP | H05-12919 A | 1/1993 |
| JP | H05-274921 A | 10/1993 |

* cited by examiner

*Primary Examiner* — Chau N Nguyen
(74) *Attorney, Agent, or Firm* — Drinker Biddle & Reath LLP

(57) ABSTRACT

The flat cable is structured such that a plurality of insulated wires with their conductors covered with insulating resin are arranged in parallel and the outer surfaces of the plurality of insulated wires are integrated. The insulating resin between two insulated wires is removed by laser beam in a soldering portion, and, among the plurality of insulated wires, only two mutually adjoining insulated wires are electrically connected to each other by soldering in the soldering portions in which the insulating resin are removed and the conductors are exposed. Such flat cable can positively solder bridge the mutually adjoining conductors.

3 Claims, 3 Drawing Sheets

FLAT CABLE

CROSS-REFERENCE TO RELATED APPLICATION

The present application claims the benefit of priority of Japanese Patent Application No. 2015-042510, filed on Mar. 4, 2015, which is incorporated herein by reference.

BACKGROUND

Technical Field

The present invention relates to a flat cable.

Related Art

A flat cable is known. The flat cable has a plurality of insulated wires, each of which is arranged parallel to each other, includes a conductor covered with insulating resin, and united together. When such the flat cable is used, the insulating resin of the end of the insulated wire is removed to expose the conductor. A method of irradiating the polyurethane coating of a polyurethane coated wire with YAG laser to remove it is disclosed in Japanese patent publication No. H05-12919. Also, a method of irradiating the polyimide coating of a polyimide coated wire with $CO_2$ laser to remove it is disclosed in Japanese patent publication No. H05-274921.

SUMMARY

The present invention provides a flat cable which comprises a plurality of insulated wires. Each of the insulated wires is arranged parallel to each other and includes a conductor covered with insulating resin. Outer surfaces of the plurality of insulated wires are integrated. The insulating resin of the plurality of insulated wires is removed by laser in a soldering portion. Two mutually adjoining insulated wires among the plurality of insulated wires are electrically connected to each other by soldering in the soldering portion of the two mutually adjoining insulated wires in which the insulating resin is removed and the conductors are exposed.

According to the flat cable of the present invention having an above mentioned new structure, a solder-bridge is securely formed between the mutually adjoining conductors. The flat cable of the present invention satisfies the need to connect together the mutually adjoining conductors in other locations than the end of the flat cable.

DETAILED DESCRIPTION

<Summary of Embodiment>

Firstly, description is given of the summary of an embodiment of the present invention.

The embodiment of the flat cable of the present invention has the following structures.

(1) A flat cable comprising a plurality of insulated wires, each of which is arranged parallel to each other and includes a conductor covered with insulating resin, wherein outer surfaces of the plurality of insulated wires are integrated, wherein the insulating resin between two insulated wires is removed by laser in a soldering portion, and wherein only two mutually adjoining insulated wires among the plurality of insulated wires are electrically connected to each other by soldering in the soldering portion of the two mutually adjoining insulated wires in which the insulating resin are removed and the conductors are exposed.

According to the flat cable having an above mentioned new structure, a solder-bridge is securely formed between the mutually adjoining conductors.

(2) A first soldering portion for forming a solder-bridge is given between a first insulated wire, namely, one of the plurality of insulated wires and a second insulated wire which is arranged in parallel adjacently to the first insulated wire. A second soldering portion for forming a solder-bridge is given between the first insulated wire and a third insulated wire which is arranged in parallel adjacently to the first insulated. wire but on the opposite side to the second insulated wire. The first soldering portion and the second soldering portion are located at different position in the longitudinal direction of the flat cable.

The flat cable having this structure can be preferably provided as a thermocouple or a heat sensor.

(3) Each of the plurality of insulated wires may include a first insulation layer for covering the conductor and a second insulation layer for covering the first insulation layer, the first insulation layer may be made of resin different from resin constituting the second insulation layer, and the second insulation layers of two mutually adjoining insulated wires may be integrated.

The flat cable having this structure can be easily removed by laser.

(4) In the plurality of insulated wires, the conductor of one of mutually adjoining insulated wires may be made of metal different from metal constituting the conductor of the other insulated wire.

The flat cable having this structure can be preferably provided as a thermocouple or a heat sensor.

<Details of the Embodiment of the Invention>

An embodiment of a flat cable of the present invention is illustrated in the following paragraphs with reference to the drawings. Here, the present invention is not limited by the described embodiment but includes all changes falling within the range of the patent claims and within the meaning and range equivalent to the range of the patent claims.

Figure 1:
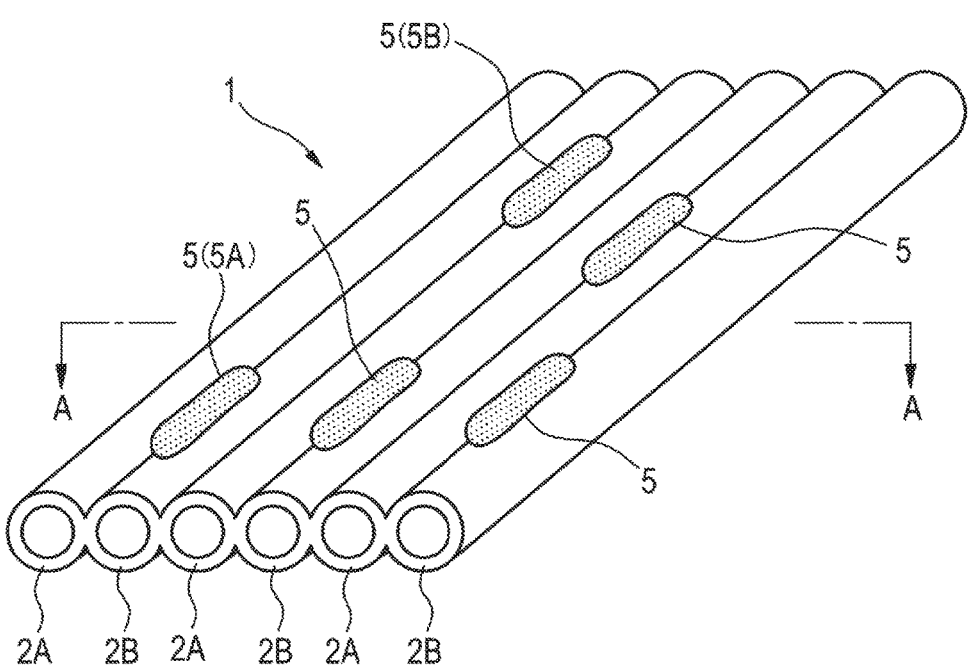
FIG. 1 is a view of an example of a flat cable according to an embodiment of the present invention.
Figure 2:
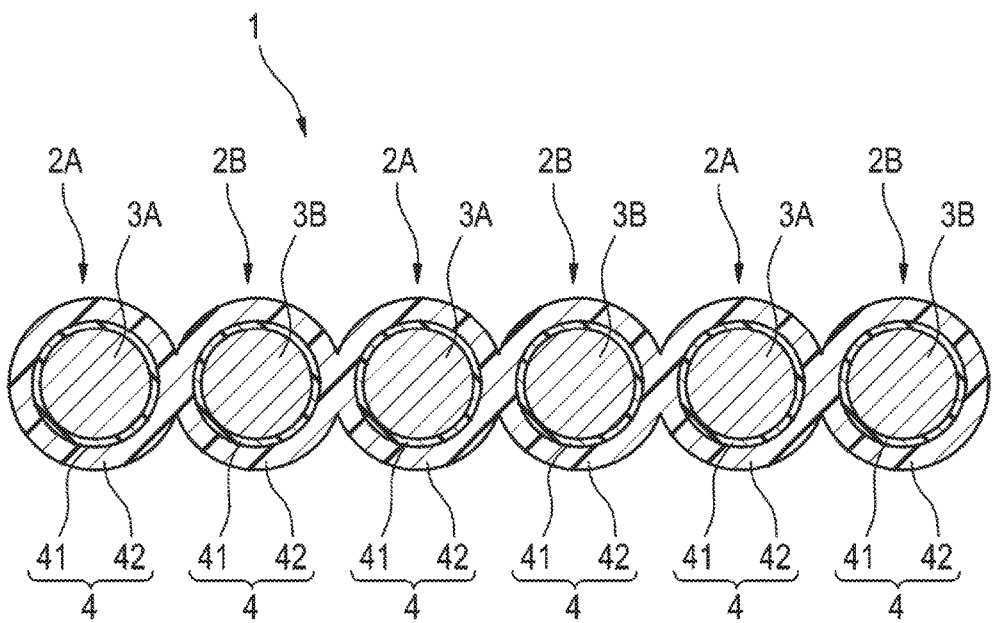
FIG. 2 is a longitudinal section taken along the A-A line of the flat cable of FIG. 1.

FIG. 1 is a perspective view of a flat cable 1 of this embodiment, and FIG. 2 is a section view taken along the A-A line of the flat cable 1.

This flat cable 1 is structured such that a plurality of insulated wires (for example, the number of the insulated wires is 6) respectively including conductors made of different kinds of metal are alternately arranged in parallel and are integrated, thereby enabling the cable to be used as a thermocouple or a heat sensor. As shown in FIGS. 1 and 2, in the flat cable 1, the outer surfaces of the insulated wires 2A, 2B arranged in a plane shape are integrated.

The insulated wire 2A includes a conductor 3A and an insulation layer 4 for covering the periphery of the conductor 3A. Also, the insulated wire 2B includes a conductor 3B and an insulation layer 4 for covering the periphery of the conductor 3B.

The conductor 3A of the insulated wire 2A has a substantially circular-shaped section and is made of copper. The insulation layer 4 includes a first insulation layer 41 for covering the periphery of the conductor 3A and a second insulation layer 42 for covering the periphery of the first insulation layer 41. The first insulation layer 41 is resin excellent in abrasion resistance, for example, polybutylene terephthalate, polyurethane, and polyacetal. The second insulation layer 42 is resin excellent in heat resistance, for example, polyamide and polyimide.

The conductor 3B of the insulated wire 2B has a substantially circular-shaped section and is made of copper and nickel. The conductor 3B may preferably be constituted of, for example, a constantan, namely, an alloy having a composition of Cu 55%:Ni 45%.

In this embodiment, the outside diameter of the conductors 3A, 3B is about 0.036~0.115 mm. In this embodiment, the first insulation layer 41 is thinner than the second insulation layer 42 but this is not limitative.

In the flat cable 1 of this embodiment, the insulated wires 2A and the insulated wires 2B are alternately arranged one by one. That is, the conductors 3A, 3B of mutually adjoining insulated wires 2A, 2B are arranged such that they are constituted of different kinds of metal. As shown in FIG. 2, the second insulation layers 42 constituting the outer-most layers (outer surfaces) of the thus-arranged insulated wires 2A, 2B are integrated to thereby constitute the flat cable 1.

As shown in FIG. 1, between the mutually adjoining insulated wires 2A, 2B, there are arranged soldering portions 5. Although described later specifically, the five soldering portions 5 of the second insulation layer 42 situated on the outer layer side of the insulation layer 4 are sublimated and removed by irradiating $CO_2$ laser (pulse laser). And, the five soldering portions 5 of the first insulation layer 41 on the inner layer side of the insulation layer 4 are sublimated and removed by YAG laser. The first insulation layer 41 is removed by a laser whose wavelength is smaller than a laser which removes the second insulation layer 42. Thus, in the soldering portions 5, the conductors 3A, 3B are exposed. Solder paste is applied to the conductors 3A, 3B exposed in the portions 5, whereby only the mutually adjoining conductors 3A, 3B are solder bridged and electrical connection between the conductors 3A and 3B is made.

In the arranging direction of the insulated wires 2A, 29, the insulated wire 2A arranged in one end (in FIG. 1, left end) is electrically connected in the soldered portions 5 only to the insulated wire 2B adjoining this insulated wire 2A. Also, the insulated wire 2B arranged in the other end (in FIG. 1, right end) is electrically connected in the soldered portions 5 only to the insulated wire 2A adjoining this insulated wire 2B. Other insulated wires 2A, 2B than the insulated wires 2A, 2B arranged in the two ends are electrically connected in the soldering portions 5 only to their mutually adjoining insulated wires 2A, 2B.

One soldering portion 5 is formed at a position different in the longitudinal direction of the flat cable 1 from a soldering portion 5 adjoining this one soldering portion 5. The adjoining soldering portions 5 means, in three parallel arranged insulated wires, a portion where the left-end insulated wire and central insulated wire are solder bridged, and a portion where the central insulated wire and the right-end insulated wire are solder bridged. For example. In FIG. 1, the position of a soldering portion 5A (which is called a first soldering portion) for solder-bridging an insulated wire 2B (which is called a first insulated wire 2B) situated second from the left end and an insulated wire 2A (which is called a second insulated wire) arranged in parallel adjacently on the left to the first insulated wire 2B, and the position of a soldering portion 5B (which is called a second soldered part) for solder-bridging the first insulated wire 2B and an insulated wire 2A (which is called a third insulated wire) arranged adjacently to the first insulated wire 2B and arranged on the opposite side (adjacently on the right side) to the second insulated wire 2B are set independently in order not to overlap with each other in the longitudinal direction of the flat cable 1.

Next, description is given of a method of manufacturing the flat cable 1 of this embodiment with reference to FIG. 3A to FIG. 4C. Here, for simplification of description, in FIG. 3A to FIG. 4C, there is shown an example where three insulated wires are arranged.

In the flat cable 1 of this embodiment, firstly, conductors 3A, 3B covered with the first insulation layers 41 are arranged in parallel alternately such that the conductors 3A, 3B made of different kinds of metal adjoin each other. Next, the whole peripheries of the first insulation layers 41 of the parallel arranged conductors 3A, 3B are covered with the second insulation layers 42, thereby integrating them.

Figure 3A:
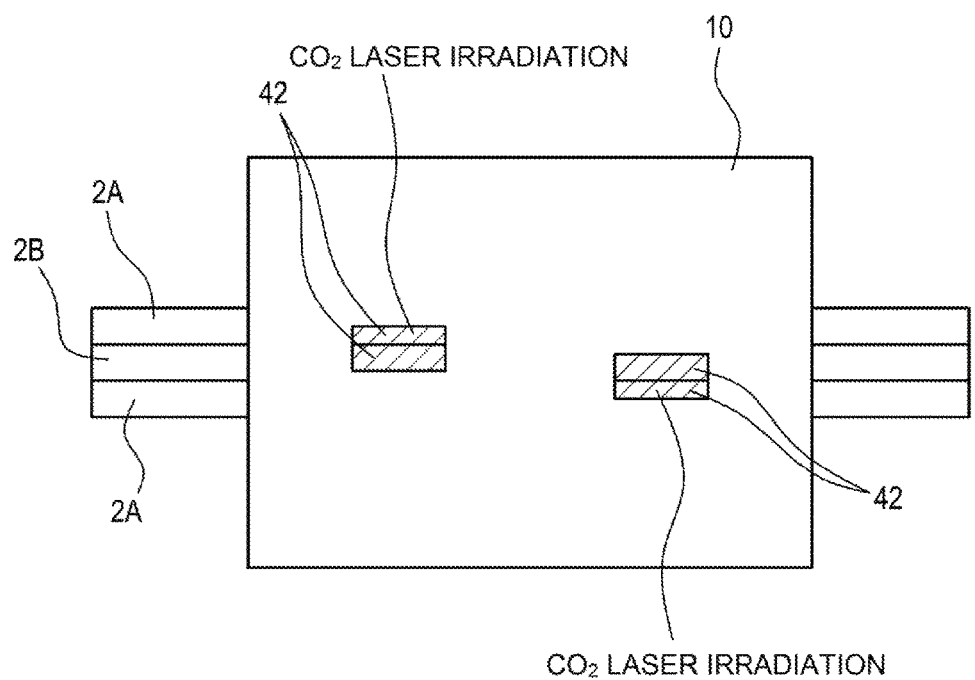
FIGS. 3A and 3B are views of an example of a method of manufacturing the flat cable shown in FIG. 1.

As shown in FIG. 3A, a mask member 10 is set on the thus integrated flat cable 1. The mask member 10 has openings 11 formed in such locations thereof as correspond to the soldering portions 5. That is, the openings 11 are formed such that they arranged at different positions in the longitudinal direction of the flat cable 1. Specifically, the openings 11, where different combinations of wires are exposed, are shifted from each other in the longitudinal direction.

Figure 3B:
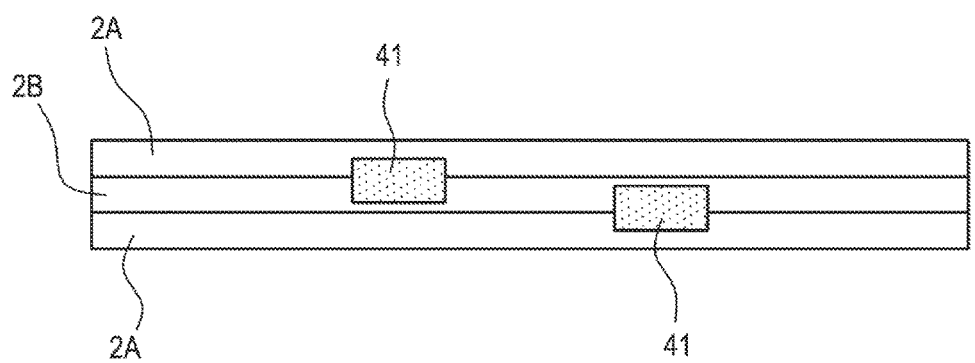

Next, $CO_2$ laser is irradiated for five seconds toward the openings 11 from above the mask member 10. Thus, as shown in FIG. 3B, in the openings 11 of the mask member 10, the second insulation layers 42 in the soldering portions 5 are removed. Here, when $CO_2$ laser is irradiated, resin constituting the second insulation layers 42 is sublimated and removed but resin constituting the first insulation layers 41 is not removed. Thus, in the soldering portions 5, only the second insulation layers 42 are removed to expose the first insulation layers 41.

Figure 4A:
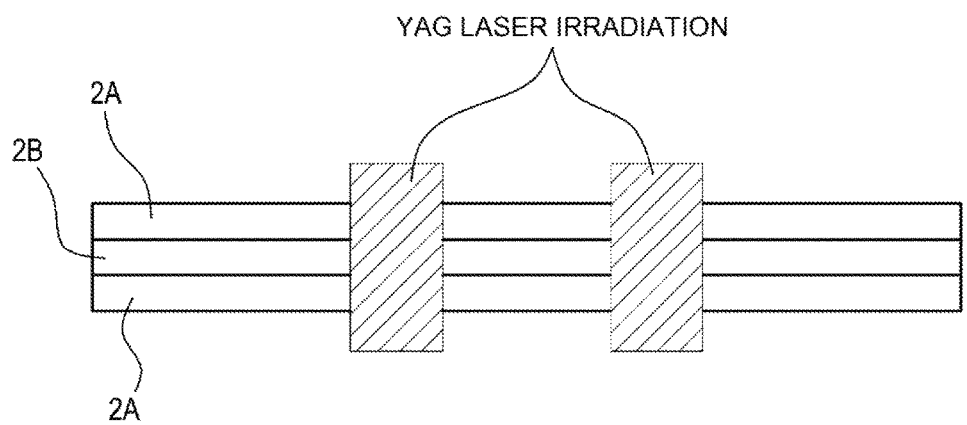
FIGS. 4A, 4B and 4C are views of an example of a method of manufacturing the flat cable shown in FIG. 1.
Figure 4B:
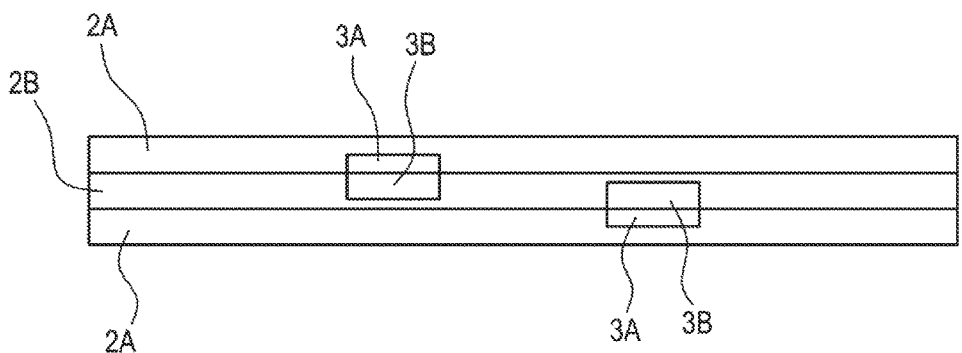

Next, as shown in FIG. 4A, the soldering portions 5 at which the second insulation layers 42 removed are irradiated with YAG laser for about five seconds. YAG laser irradiation can remove completely the resin constituting the first insulation layers 41, whereby, as shown in FIG. 4B, the second insulation layers 42 in the soldering portions 5 are removed to thereby expose the conductors 3A, 3B.

Figure 4C:
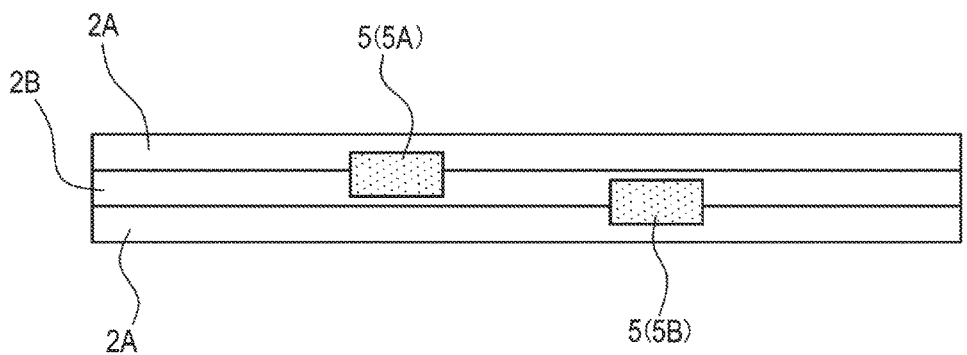

Next, as shown in FIG. 4C, the soldering portions 5 (5A, 5B) at which the conductors 3A, 3B are exposed are coated with a solder paste. After the solder paste is heated and melted, by letting it cool naturally and harden, the conductors 3A, 3B are electrically connected together through solder-bridging, thereby providing the flat cable 1 of this embodiment.

As described above, as the insulating resin removing method, there are available the method of mechanically removing the insulating resin using a sharp needle and the method of scraping off the insulating resin while heating it using a soldering iron. However, these methods take a long operation time and are hard to remove the insulating resin completely without damaging the conductor or remained resin.

Meanwhile, in the flat cable 1 of this embodiment, the insulation layers 4 (first insulation layers 41 and second insulation layers 42) in the soldering portions 5 for soldering the insulated wires 2A, 2B are removed by laser beam and, of the insulated wires 2A, 2B, only two mutually adjoining insulated wires 2A, 2B are electrically connected in the soldering portions 5 by soldering. Thus, the insulation layers 4 are removed locally by laser beam such that only the soldering portions of the mutually adjoining conductors 3A, 3B are exposed, thereby enabling provision of the flat cable 1 having a new structure capable of securely solder-bridging the mutually adjoining conductors 3A, 3B. Further, the insulating resin (insulation layers 4) of the insulated. wires 2A, 2B can be removed in a shorter time than the prior art.

Supposing all insulated wires in the same locations in the longitudinal direction of a flat cable are solder-connected collectively, metals of the same kind are also connected electrically. Such flat cable cannot be used as a thermocouple.

However, in the flat cable 1 of this embodiment, the position of the first soldering portion 5A for solder-bridging, of the insulating wires 2A, 2B, the second soldering portion 5B for solder-bridging the first insulated wire 2B and a third insulated wire 2A arranged adjacently to the first insulated wire 2B but on the opposite side to the second insulated wire 2A are set at different position in the longitudinal direction of the flat cable 1. Thus, the flat cable 1 can be preferably used as a thermocouple or a heat sensor.

Also, the insulated wires 2A, 2B respectively include the first insulation layers 41 for covering the conductors 3A, 3B and the second insulation layers 42 for covering the first insulation layers 41; and, the first insulation layers 41 are made of different resin from the second insulation layers 42, and the second insulation layers 42 are integrated, thereby producing the flat cable 1. By removing the first and second insulation layers 41 and 42 made of different resin by different lasers ($CO_2$ laser, YAG laser), the insulating resin can be removed efficiently and positively.

Here, $CO_2$ laser (first laser) can remove resin constituting the second insulation layer 42 on the outer layer side in a very short working time but is difficult to remove completely the resin constituting the first insulation layer 41 on the inner layer side. Also, YAG laser (second laser) can remove the resin constituting the first insulation layer 41 but cannot remove the resin constituting the second insulation layer 42. A wavelength of the first laser differs from a wavelength of the second laser Thus, in this embodiment, firstly, the second insulation layer 42 is removed by $CO_2$ laser and next the first insulation layer 41 is removed by YAG laser different from $CO_2$ laser, whereby the insulation layers 4 of the insulated wires 2A, 2B can be removed reliably in a short operation time. This can enhance the reliability of the solder-bridging between the conductors 3A and 3B.

Although the present invention has been described heretofore specifically with reference to the specific embodiment thereof, it is obvious to persons skilled in the art that various changes and modifications can be added without departing from the spirit and scope of the present invention. Also, the number, positions, shapes and others of the above-mentioned composing elements are not limited to the above embodiment but can be changed to the number, positions, shapes and others suitable in enforcing the present invention.

The invention claimed is:

1. A flat cable comprising:
a plurality of insulated wires, each of which is arranged parallel to each other along an entire length in a longitudinal direction of the flat cable and includes a conductor having a substantially circular-shaped section and covered with insulating resin,
wherein outer surfaces of the plurality of insulated wires are integrated along the longitudinal direction,
wherein the insulating resin between two mutually adjoining insulated wires of the plurality of insulated wires is removed by laser in a soldering portion,
wherein only the two mutually adjoining insulated wires are electrically connected to each other by soldering in the soldering portion of the two mutually adjoining insulated wires in which the insulating resin are removed and the conductors are exposed,
wherein the two mutual adjoining insulated wires consist of a first insulated wire and a second insulated wire, and the position of a first soldering portion for forming a solder-bridge between the first insulated wire and the second insulated wire arranged in parallel adjacently to the first insulated wire and the position of a second soldering portion forming a solder-bridge between the first insulated wire and a third insulated wire included in the plurality of insulated wires arranged in parallel adjacently to the first insulated wire but on the opposite side to the second insulated wire are different from each other in the longitudinal direction of the flat cable.

2. The flat cable according to claim 1, wherein the insulating resin includes a first insulation layer for covering the conductor and a second insulation layer for covering the first insulation layer, the first insulation layer is made of resin different from resin constituting the second insulation layer, and the second insulation layers of two mutually adjoining insulated wires are integrated.

3. The flat cable according to claim 1, wherein, in the plurality of insulated wires, the conductor of one of the two mutually adjoining insulated wires is made of metal different from metal constituting the conductor of the other insulated wire.

* * * * *